United States Patent
Yu et al.

(10) Patent No.: US 11,414,520 B2
(45) Date of Patent: Aug. 16, 2022

(54) POLYAMIDE-IMIDE COPOLYMER AND POLYAMIDE-IMIDE FILM COMPRISING THE SAME

(71) Applicant: LG CHEM, LTD., Seoul (KR)

(72) Inventors: Yunah Yu, Daejeon (KR); Hyung Sam Choi, Daejeon (KR); Byung Guk Kim, Daejeon (KR); Young Sik Eom, Daejeon (KR); Sung Yeol Choi, Daejeon (KR); Sang Gon Kim, Daejeon (KR); Duk Hun Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 320 days.

(21) Appl. No.: 16/757,484

(22) PCT Filed: Oct. 15, 2018

(86) PCT No.: PCT/KR2018/012129
§ 371 (c)(1),
(2) Date: Apr. 20, 2020

(87) PCT Pub. No.: WO2019/117445
PCT Pub. Date: Jun. 20, 2019

(65) Prior Publication Data
US 2021/0189068 A1  Jun. 24, 2021

(30) Foreign Application Priority Data
Dec. 11, 2017 (KR) .................. 10-2017-0169717
Oct. 12, 2018 (KR) .................. 10-2018-0121996

(51) Int. Cl.
*C08G 73/14* (2006.01)
*C08G 73/10* (2006.01)
*C08J 5/18* (2006.01)

(52) U.S. Cl.
CPC ......... *C08G 73/14* (2013.01); *C08G 73/1039* (2013.01); *C08J 5/18* (2013.01); *C08J 2379/08* (2013.01)

(58) Field of Classification Search
None
See application file for complete search history.

(56) References Cited

U.S. PATENT DOCUMENTS

| | | | |
|---|---|---|---|
| 2012/0296050 A1* | 11/2012 | Cho | ........................ C09J 179/08 264/165 |
| 2014/0031499 A1 | 1/2014 | Cho et al. | |
| 2016/0039977 A1 | 2/2016 | Cho et al. | |
| 2016/0075826 A1 | 3/2016 | Sun et al. | |
| 2016/0222166 A1 | 8/2016 | Ahn et al. | |
| 2017/0130004 A1 | 5/2017 | Choi et al. | |
| 2017/0190880 A1 | 7/2017 | Jo et al. | |
| 2017/0218200 A1 | 8/2017 | Ahn et al. | |
| 2018/0194900 A1 | 7/2018 | Choi et al. | |

FOREIGN PATENT DOCUMENTS

| | | |
|---|---|---|
| CN | 101307013 A | 11/2008 |
| CN | 103571190 A | 2/2014 |
| CN | 106928706 A | 7/2017 |
| EP | 2540760 A1 | 1/2013 |
| JP | H01-292034 A | 11/1989 |
| JP | H08-269195 A | 10/1996 |
| JP | 2007-262214 A | 10/2007 |
| JP | 2008-074991 A | 4/2008 |
| KR | 10-2013-0029129 A | 3/2013 |
| KR | 10-1523730 B1 | 5/2015 |
| KR | 10-2015-0077177 A | 7/2015 |
| KR | 10-2016-0095910 A | 8/2016 |
| KR | 10-2017-0003272 A | 1/2017 |
| KR | 10-1729731 B1 | 4/2017 |
| KR | 10-2017-0054108 A | 5/2017 |
| KR | 10-2017-0089585 A | 8/2017 |
| KR | 10-2017-0116513 A | 10/2017 |
| KR | 10-2017-0132459 A | 12/2017 |
| WO | 2016-108631 A1 | 7/2016 |
| WO | 2016-209060 A1 | 12/2016 |
| WO | 2017-003173 A1 | 1/2017 |
| WO | 2017-179877 A1 | 10/2017 |
| WO | 2017-204462 A1 | 11/2017 |

OTHER PUBLICATIONS

International Search Report issued for international Application No. PCT/KR2018/012129 dated Jan. 30, 2019, 4 pages.

* cited by examiner

*Primary Examiner* — Jas A Sangh Era
(74) *Attorney, Agent, or Firm* — Rothwell, Figg, Ernst & Manbeck, P.C.

(57) ABSTRACT

The polyamide-imide copolymer according to the present disclosure makes it possible to provide a polyamide-imide film that is excellent in both thermal stability and mechanical properties, and is capable of realizing anisotropy.

11 Claims, No Drawings

POLYAMIDE-IMIDE COPOLYMER AND POLYAMIDE-IMIDE FILM COMPRISING THE SAME

CROSS-REFERENCE TO RELATED APPLICATION

This application is a 35 U.S.C. 371 National Phase Entry Application from PCT/KR2018/012129, filed on Oct. 15, 2018, designating the United States and which claims the benefits of Korean Patent Applications No. 10-2017-0169717 filed on Dec. 11, 2017 and No. 10-2018-0121996 filed on Oct. 12, 2018 with the Korean Intellectual Property Office, the disclosures of which are incorporated herein by reference in their entirety.

The present disclosure relates to a polyamide-imide copolymer and a polyamide-imide film including the same.

TECHNICAL FIELD

Background of Art

An aromatic polyamide-imide resin is a polymer mostly having an amorphous structure, and exhibits excellent heat resistance, chemical resistance, electrical properties, and dimensional stability due to its rigid chain structure. The polyamide-imide resin is widely used as a material for electrical/electronics, aerospace, aviation, and automobile fields.

However, a wholly aromatic polyamide-imide resin is generally insoluble and has a high softening temperature in spite of excellent heat resistance, so that moldability and processability are deteriorated, and it is difficult to use conventional processing equipment for resin processing.

Therefore, various attempts have been made to improve the moldability of the polyamide-imide resin while minimizing deterioration of excellent heat resistance and mechanical properties at high temperatures. For example, a method of introducing —O—, —S—, or the like, and a method of introducing a meta-substituent or a bulky molecular structure to increase flexibility of chains in the polyimide resin, have been proposed. With the polyamide-imide resin according to the above proposals, it is difficult to exhibit sufficient heat resistance due to a bending structure or an aliphatic cyclic compound, and a film prepared using the same still has a limit of poor mechanical properties.

Further, when the polyamide-imide resin is used as a material for a flexible display, it is required to have excellent optical properties in addition to thermal and mechanical properties, but it is difficult to simultaneously satisfy such properties at a required level.

DETAILED DESCRIPTION OF THE INVENTION

The present disclosure provides a polyamide-imide copolymer exhibiting excellent optical properties while having excellent heat resistance and mechanical properties.

In addition, the present disclosure provides a polyimide film including the polyamide-imide copolymer.

The present disclosure provides a polyamide-imide copolymer including a first repeating unit represented by Chemical Formula 1, a second repeating unit represented by Chemical Formula 2, and a third repeating unit represented by Chemical Formula 3, wherein a mole ratio of the second repeating unit to the third repeating unit is 10:90 to 50:50:

[Chemical Formula 1]

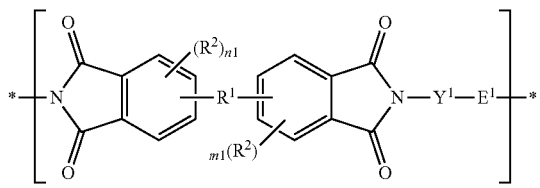

wherein, in Chemical Formula 1,
each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O) NH—, or a C6 to C30 divalent aromatic organic group;
each $R^2$ is the same as or different from each other in each repeating unit, and each is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;
n1 and m1 are each independently an integer of 0 to 3;
each $Y^1$ is the same as or different from each other in each repeating unit, and each independently includes a C6 to C30 divalent aromatic organic group containing at least one trfluoromethyl group (—CF$_3$), and the aromatic organic group exists alone, or two or more aromatic organic groups are bonded to each other to form a condensed ring, or two or more aromatic organic groups are linked by a single bond, a fluorenylene group, —O—, —S—, —C(=O)—, —CH (OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, or —C(=O)NH—; and
each $E^1$ is independently a single bond or —NH—,

[Chemical Formula 2]

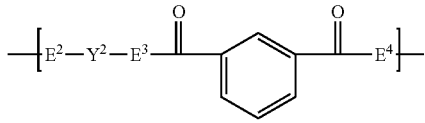

[Chemical Formula 3]

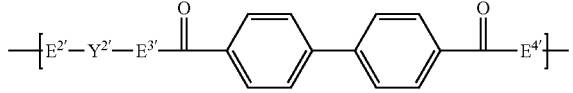

wherein, in Chemical Formulae 2 and 3,
$Y^2$ and $Y^{2'}$ are the same as or different from each other in each repeating unit, and each is independently a C6 to C30 divalent aromatic organic group containing at least one trfluoromethyl group (—CF$_3$), and the aromatic organic group exists alone, or two or more aromatic organic groups are bonded to each other to form a condensed ring, or two or more aromatic organic groups are linked by a single bond, a fluorenylene group, —O—, —S—, —C(=O)—, —CH (OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—; and
$E^2$, $E^{2'}$, $E^3$, $E^{3'}$, $E^4$, and $E^{4'}$ are independently a single bond or —NH—.

The present disclosure also provides a polyamide-imide film including the polyamide-imide copolymer.

Hereinafter, the polyamide-imide copolymer and the polyamide-imide film including the same according to the exemplary embodiments of the present disclosure will be described in more detail.

Prior to that, the terms are used merely to refer to specific embodiments, and are not intended to restrict the present disclosure unless this is explicitly expressed.

Singular expressions of the present disclosure may include plural expressions unless it is differently expressed contextually.

The words "include", "comprise", and the like of the present disclosure are used to specify certain features, regions, integers, steps, operations, elements, and/or components, and these do not exclude the existence or the addition of certain other features, regions, integers, steps, operations, elements, and/or components.

Also, the terms including ordinal numbers such as "first" and "second" are used to distinguish one component from another, and the components are not limited by the ordinal number. For example, within the scope of the present invention, the first component may also be referred to as a second component, and similarly, the second component may be referred to as a first component.

In this present disclosure, the weight average molecular weight refers to a weight average molecular weight measured by a GPC method and calibrated with polystyrene. In the process of measuring the weight average molecular weight calibrated with polystyrene by a GPC method, a known analyzer, a detector such as a refractive index detector, and an analyzing column may be used. Conventional temperature conditions, solvents, and flow rates can be applied.

I. Polyamide-Imide Copolymer

According to one embodiment of the present disclosure, a polyamide-imide copolymer including a first repeating unit represented by Chemical Formula 1, a second repeating unit represented by Chemical Formula 2, and a third repeating unit represented by Chemical Formula 3 is provided.

Since the polyamide-imide copolymer is applied to various fields, it is required to satisfy various physical properties at the same time. As a result of studies by the present inventors, it was confirmed that thermal, mechanical, and optical properties of the copolymer can be simultaneously improved by introducing two specific structures into amide-derived repeating units in the preparation of a polyamide-imide copolymer. Concretely, it was confirmed that when diacyl halide, dicarboxylic acid, and dicarboxylate compounds are respectively limited to specific structures and a mole ratio thereof is limited, optical properties of the polyamide-imide copolymer can be improved while maintaining excellent mechanical properties and heat resistance. Particularly, as the copolymer exhibits anisotropy, it is easily applied to a flexible display or the like.

(i) Imide-Derived Repeating Unit: First Repeating Unit

[Chemical Formula 1]

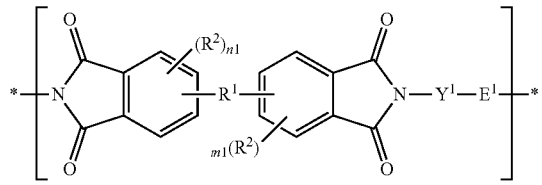

In Chemical Formula 1, each $R^1$ is the same as or different from each other in each repeating unit, and each is independently a single bond, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(═O)NH—, or a C6 to C30 divalent aromatic organic group;

each $R^2$ is the same as or different from each other in each repeating unit, and each is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and m1 are each independently an integer of 0 to 3;

each $Y^1$ is the same as or different from each other in each repeating unit, and each independently includes a C6 to C30 divalent aromatic organic group containing at least one trfluoromethyl group (—CF$_3$), and the aromatic organic group exists alone, or two or more aromatic organic groups are bonded to each other to form a condensed ring, or two or more aromatic organic groups are linked by a single bond, a fluorenylene group, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—; and each $E^1$ is independently a single bond or —NH—.

Herein, the single bond means a case that $R^1$ in Chemical Formula 1 is a chemical bond which simply links the groups on both sides.

Each $R^2$ is the same as or different from each other in each repeating unit, and each may independently be —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

n1 and m1 may each independently be an integer of 0 to 3.

Each $Y^1$ is the same as or different from each other in each repeating unit, and each may independently be a C3 to C10 aliphatic organic group.

Each $E^1$ may independently be a single bond or —NH—.

Herein, the single bond means a case that $E^1$ is a chemical bond which simply links the groups on both sides.

Preferably, the first repeating unit may include a repeating unit represented by Chemical Formula 1-1:

[Chemical Formula 1-1]

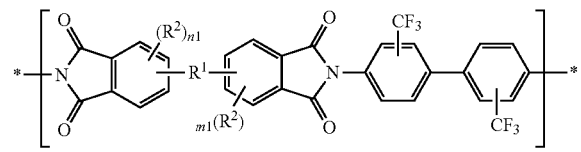

wherein, in Chemical Formula 1-1, $R^1$, $R^2$, n1, and m1 are as defined in Chemical Formula 1.

(ii) Amide-Derived Repeating Unit: Second Repeating Unit and Third Repeating Unit

[Chemical Formula 2]

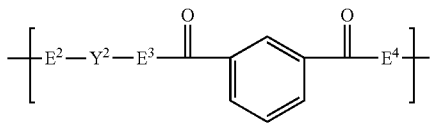

[Chemical Formula 3]

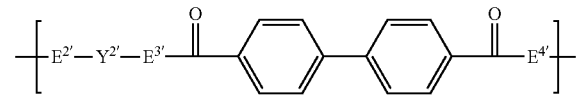

In Chemical Formulae 2 and 3, $Y^2$ and $Y^{2'}$ are the same as or different from each other in each repeating unit, and each is independently a C6 to C30 divalent aromatic organic group containing at least one trifluoromethyl group (—CF$_3$), and the aromatic organic group exists alone, or two or more aromatic organic groups are bonded to each other to form a condensed ring, or two or more aromatic organic groups are linked by a single bond, a fluorenylene group, —O—, —S—, —C(═O)—, —CH(OH)—, —S(═O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(═O)NH—; and E$^2$, E$^{2'}$, E$^3$, E$^{3'}$, E$^4$, and E$^{4'}$ are independently a single bond or —NH—.

The second repeating unit and the third repeating unit are amide-derived repeating units. In Chemical Formulae 2 and 3, the divalent linking group in the form of —C(═O)-A-C(═O)— is derived from at least one compound selected from the group consisting of diacyl halide, dicarboxylic acid, and dicarboxylate. In the second repeating unit, two of —C(═O)— are bonded at a para position with respect to A

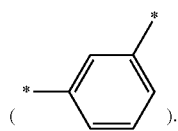

In the third repeating unit, two of —C(═O)— are bonded at a para position with respect to A

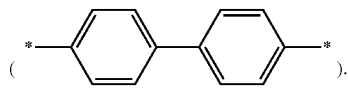

Preferably, the second repeating unit may include a repeating unit represented by Chemical Formula 2-1:

[Chemical Formula 2-1]

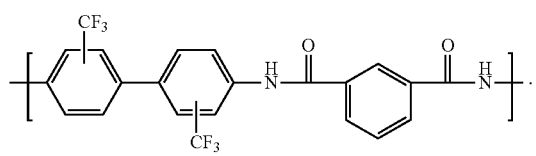

Preferably, the third repeating unit may include a repeating unit represented by Chemical Formula 3-1:

[Chemical Formula 3-1]

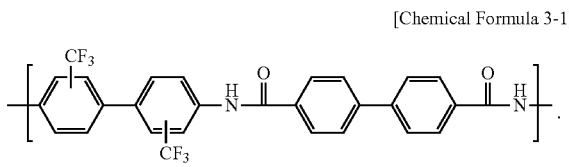

In the polyamide-imide copolymer according to the present disclosure, a mole ratio of the second repeating unit to the third repeating unit is 10:90 to 50:50, and by satisfying the mole ratio, thermal, mechanical, and optical properties of the copolymer can be simultaneously improved.

Concretely, a flexibility-improving effect according to the bonding structure at the meta position of the second repeating unit and a mechanical property-improving effect result-ing from a rigid characteristic according to the bonding structure at the para position of the third repeating unit are combined, thereby improving thermal, mechanical, and optical properties at the same time.

When the mole ratio of the second repeating unit and the third repeating unit is out of the above range, haze may increase or heat resistance may be deteriorated such that yellowing may occur.

In the polyamide-imide copolymer according to the present disclosure, a mole ratio of the first repeating unit derived from an imide to a sum of the second repeating unit and the third repeating unit derived from an amide may preferably be 5:5 to 2:8 (1:1 to 1:4), 4.5:5.5 to 3:7 (about 1:1.22 to 1:2.33), or 4:6 to 3:7. By simultaneously satisfying the mole ratio and the above-mentioned mole ratio of the second repeating unit and the third repeating unit, mechanical, thermal, and optical properties of the polyamide-imide resin film can be simultaneously improved to a high level.

In the polyamide-imide copolymer according to the present disclosure, the mole ratio of the first repeating unit derived from an imide to a sum of the second repeating unit and the third repeating unit derived from an amide may preferably be 3:7 to 6:4. By simultaneously satisfying the mole ratio and the above-mentioned mole ratio of the second repeating unit and the third repeating unit, mechanical, thermal, and optical properties of the copolymer can be simultaneously improved to a high level.

In the polyamide-imide block copolymer, when a mole ratio of the first repeating unit to a sum of the second repeating unit and the third repeating unit is 3:7 to 4:6, a mole ratio of the second repeating unit to the third repeating unit may be 20:80 to 50:50, preferably 30:70 to 45:55, and more preferably 30:70. When the above ranges are simultaneously satisfied, mechanical, thermal, and optical properties of the polyamide-imide resin film can be simultaneously improved to a high level.

In the polyamide-imide block copolymer, when a mole ratio of the first repeating unit to a sum of the second repeating unit and the third repeating unit is 4.5:5.5 to 6:4, a mole ratio of the second repeating unit to the third repeating unit may be 20:80 to 40:60. When the above ranges are simultaneously satisfied, mechanical, thermal, and optical properties of the polyamide-imide resin film can be simultaneously improved to a high level.

In one embodiment of the present disclosure, the polyamide-imide copolymer may further include a fourth repeating unit represented by Chemical Formula 4, in addition to the first repeating unit, the second repeating unit, and the third repeating unit:

[Chemical Formula 4]

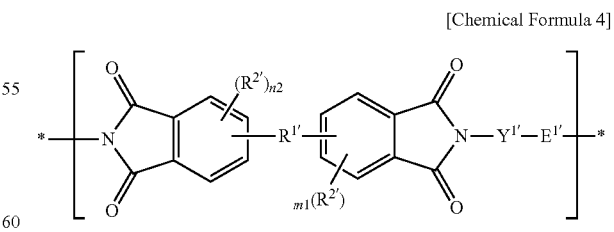

wherein, in Chemical Formula 4, each R$^{1'}$ is the same as or different from each other in each repeating unit, and each may independently include a C6 to C30 divalent aromatic organic group; and the aromatic organic group may exist alone, or two or more aromatic organic groups may be bonded to each other to form a condensed ring, or two or more aromatic organic groups may be linked by a single bond, a fluorenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, or —C(=O)NH—.

Each $R^{2'}$ is the same as or different from each other in each repeating unit, and each may independently be —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

n2 and m2 may each independently be an integer of 0 to 3.

Each $Y^{1'}$ is the same as or different from each other in each repeating unit, and each may independently be a C6 to C30 divalent aromatic organic group containing at least one trifluoromethyl group (—CF$_3$); and the aromatic organic group may exist alone, or two or more aromatic organic groups may be bonded to each other to form a condensed ring, or two or more aromatic organic groups may be linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Each $E^{1'}$ may independently be a single bond or —NH—.

As described above, since the polyamide-imide block copolymer including all of the first repeating unit, the second repeating unit, and the third repeating unit satisfies the mole ratio of the second repeating unit to the third repeating unit, and the mole ratio of the imide-derived first repeating unit to the amide-derived second and third repeating units is within a specific range, it is possible to simultaneously improve mechanical, thermal, and optical properties of the copolymer.

In addition, the polyamide-imide copolymer may have a weight average molecular weight of 10,000 to 1,000,000 g/mol, preferably 15,000 to 800,000 g/mol. When the molecular weight is satisfied, the mechanical, thermal, and optical properties pursued by the present disclosure can be further improved.

The polyamide-imide copolymer may be prepared by a method including the steps of: mixing a compound forming the first repeating unit in an appropriate solvent to initiate a reaction; adding a compound forming the second repeating unit to the reaction mixture and reacting; adding a compound forming the third repeating unit to the reaction mixture and reacting; and inducing a chemical imidization reaction by adding a compound such as acetic anhydride or pyridine to the reaction mixture or inducing a thermal imidization reaction of amic acids by azeotropic distillation.

Further, when the polyamide-imide copolymer further includes the fourth repeating unit, it may be prepared by a method including the steps of: mixing a compound forming the first repeating unit in an appropriate solvent to initiate a reaction; adding a compound forming the second repeating unit to the reaction mixture and reacting; adding a compound forming the third repeating unit to the reaction mixture and reacting; adding a compound forming the fourth repeating unit to the reaction mixture and reacting; and inducing a chemical imidization reaction by adding a compound such as acetic anhydride or pyridine to the reaction mixture or inducing a thermal imidization reaction of amic acids by azeotropic distillation.

The polyimide block copolymer may be prepared by low-temperature solution polymerization, interfacial polymerization, melt polymerization, solid phase polymerization, or the like.

II. Polyamide-Imide Film

According to another embodiment of the present disclosure, a polyamide-imide film including the polyamide-imide copolymer is provided.

As described above, according to a result of studies by the present inventors, it was confirmed that thermal, mechanical, and optical properties of the copolymer can be simultaneously improved by introducing specific structures into amide-derived repeating units. Particularly, it was confirmed that optical properties of the resin, in particular anisotropy, can be obtained while maintaining mechanical properties and heat resistance at an excellent level, by adjusting the imide-derived repeating unit (first repeating unit) and the amide-derived repeating unit (second repeating unit and third repeating unit) into which the specific structure is introduced at a specified ratio.

As a result, the polyimide film including the polyamide-imide block copolymer can be used as a material for various molded products requiring both excellent thermal properties and high mechanical properties. In particular, since the polyimide film according to the present disclosure exhibits anisotropy, it is easily applied to an electrical and electronic product, particularly, a flexible display.

According to one embodiment of the present disclosure, the polyimide film may have thickness direction retardation (Rth) of 4000 nm to 6000 nm, preferably 4000 nm to 5500 nm, or 4050 nm to 5200 nm, measured at a wavelength of 400 nm to 800 nm for a specimen having a thickness of 20 to 100 μm. By satisfying the thickness direction retardation (Rth) within the above range, it is possible for the film to have excellent optical properties and exhibit anisotropy, which makes it easy to be applied to a flexible display or the like. The thickness direction retardation (Rth) can be measured by common methods and measuring apparatuses. For example, an apparatus for measuring the thickness direction retardation (Rth) includes AxoScan, a Prism Coupler manufactured by AXOMETRICS, and the like.

The thickness direction retardation (Rth) can be measured by a method including the steps of: measuring a refractive index of the copolymer film in a region of 400 nm to 800 nm using a prism coupler, and inputting the refractive index to AxoScan; measuring the thickness direction retardation (Rth) of the polyamide-imide resin film using light having a wavelength of 400 nm to 800 nm at a temperature of 25° C. and humidity of 40%; and converting the thickness direction retardation value (measured value by automatic measurement (automatic calculation) of the measuring apparatus) into a retardation value per 10 μm thickness of the film.

The value of the "refractive index of the polyamide-imide resin film" used for the measurement of the thickness direction retardation (Rth) is measured by forming an unstretched film including the polyamide-imide resin which forms a film to be measured for retardation, and using the unstretched film as a measuring sample (when the film to be measured is an unstretched film, the film can be directly used as a measuring sample). Thereafter, the refractive index with respect to light of 400 nm to 800 nm in an in-plane direction (direction perpendicular to the thickness direction) of the sample is measured by using a measuring apparatus (product name of NAR-1T SOLID, manufactured by Atago Co., Ltd.) with a light source of 400 to 800 nm at a temperature of 23° C.

In addition, since the measuring sample is unstretched, the refractive index in in-plane direction of the film becomes constant in any direction in the plane. By measuring the refractive index, it is possible to measure the refractive index inherent to the isotropic polyamide-imide resin film (since the measuring sample is unstretched, when the refractive index in a delay-axis direction in the plane is Nx and the refractive index in an in-plane direction perpendicular to the delay-axis direction is Ny, it becomes Nx=Ny). As described above, the inherent refractive index (400 nm to 800 nm) of the polyamide-imide resin film is measured using an unstretched film, and the obtained value is used for measuring the thickness direction retardation (Rth). Herein, a size of the isotropic polyamide-imide resin film of the measuring sample is not particularly limited as long as it can be used in the measuring apparatus for the refractive index. For example, it may be a square having sides of 1 cm (1 cm in length and width) and a thickness of 13 μm.

According to one embodiment of the present disclosure, the polyamide-imide film may have a yellow index (Y.I.) of 2.0 to 10.0, preferably 2.2 to 7.0 or 2.5 to 5.0, with respect to a specimen having a thickness of 20 μm to 100 μm at a wavelength of 380 to 780 nm in accordance with ASTM D1925. By satisfying the yellow index within the above range, it is possible for the film to have excellent optical properties and to be easily applied to various electrical and electronic products.

The polyamide-imide film may be prepared by a conventional method such as a dry method or a wet method using the polyamide-imide copolymer. For example, the polyamide-imide film may be obtained by coating a solution containing the copolymer on an arbitrary support to form a film, and drying the film by evaporating the solvent from the film. If necessary, stretching and heat treatment for the polyamide-imide film may be carried out.

The polyamide-imide film according to the present disclosure can be used as a material for various molded products requiring high mechanical and optical properties along with colorless transparency. For example, the polyimide-imide film containing the polyamide-imide block copolymer can be used as a substrate for a display, a protective film for a display, a touch panel, or a cover film for a flexible or foldable device.

Advantageous Effects

The polyamide-imide copolymer according to the present disclosure makes it possible to provide a polyamide-imide film that is excellent in both thermal stability and mechanical properties, and is capable of realizing excellent optical properties.

DETAILED DESCRIPTION OF THE EMBODIMENTS

Hereinafter, preferred examples are provided for better understanding. However, these examples are for illustrative purposes only, and the invention is not intended to be limited by these examples.

[PREPARATION EXAMPLES]—PREPARATION OF A POLYAMIDE-IMIDE COPOLYMER

Preparation Example 1

2,2'-bis(trifluoromethly)benzidine, 4,4'-(hexafluoroisopropylidene)diphthalic anhydride, and dimethylacetamide were placed to a 500 mL round flask equipped with a Dean-Stark apparatus and a condenser, and the reaction was initiated at room temperature. The reaction mixture was stirred using ice water at 0° C. for 4 hours under a nitrogen atmosphere.

After 4 hours, the reaction product returned to room temperature, and 2,2'-bis(trifluoromethyl)benzidine, isophthaloyl dichloride (IPC), 4,4'-biphenyldicarbonyl chloride (BPC), and dimethylacetamide were added thereto. Thereafter, the reaction was initiated at room temperature (25° C.±3° C.) under a nitrogen atmosphere. After the formation of a polyamic acid polymer by the reaction for 4 hours, acetic anhydride and pyridine were added to the reaction mixture, and the mixture was stirred in an oil bath at 40° C. for 15 hours to carry out a chemical imidization reaction.

After the completion of the reaction, the reaction mixture was precipitated in water and ethanol (1:1 (v/v)) to obtain a polyamide-imide block copolymer A-1 containing the following first repeating unit, second repeating unit, and third repeating unit (weight average molecular weight: about 200,000 g/mol). The obtained copolymer had a mole ratio of the first repeating unit to the second repeating unit and the third repeating unit (①) of 50:50 and a mole ratio of the second repeating unit to and the third repeating unit (②) of 20:80.

[First Repeating Unit]

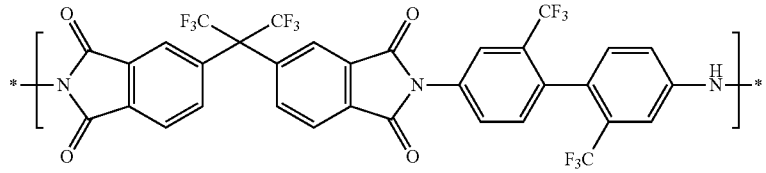

[Second Repeating Unit]—Amide-Derived Repeating Unit (Derived from IPC)

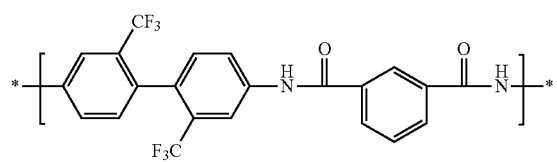

[Third Repeating Unit]—Amide-Derived Repeating Unit (Derived from BPC)

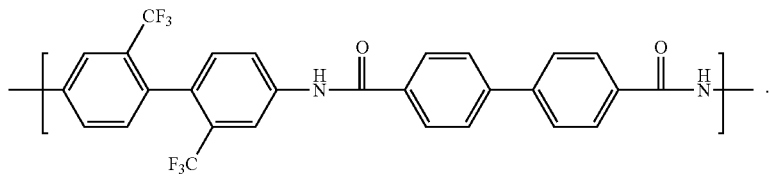

Preparation Examples 2 to 8, 10, and 11

Polyamide-imide copolymers were prepared by controlling the amount of the respective monomers so as to satisfy the mole ratios (①  and ②) shown in Table 1 below.

Preparation Example 9

A copolymer containing the following 2-2 repeating unit in place of the third repeating unit was prepared in the same manner as in Preparation Example 1, except that terephthaloyl dichloride (TPC) was used in place of the 4,4'-biphenyldicarbonyl chloride (BPC).

[2-2 Repeating Unit]—Amide-Derived Repeating Unit (Derived from TPC)

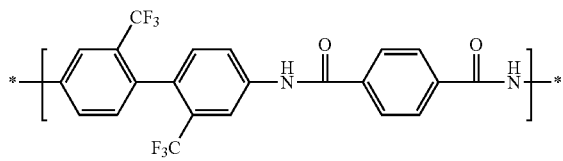

Examples and Comparative Examples

The polyamide-imide copolymer obtained in one of preparation examples was dissolved in dimethyacetamide to prepare a solution of about 10 wt %. The solution was cast on a glass plate using a bar coater, and a drying temperature was controlled to 80° C. and 140° C. in sequence. A polyamide-imide film having a thickness of 50 μm according to one of examples and comparative examples was obtained (see Table 1).

TABLE 1

| Index | Copolymer | Imide:Amide (mol %) ① | Ratio of amide repeating units - ② Kinds | Ratio | Weight average molecular weight of copolymer |
|---|---|---|---|---|---|
| Ex. 1 | Prep. Ex. 1 | 50:50 | IPC:BPC | 20:80 | 520,000 |
| Ex. 2 | Prep. Ex. 2 | 50:50 | IPC:BPC | 30:70 | 490,000 |
| Ex. 3 | Prep. Ex. 3 | 40:60 | IPC:BPC | 20:80 | 420,000 |
| Ex. 4 | Prep. Ex. 4 | 40:60 | IPC:BPC | 30:70 | 360,000 |
| Ex. 5 | Prep. Ex. 5 | 40:60 | IPC:BPC | 40:60 | 270,000 |
| Ex. 6 | Prep. Ex. 6 | 35:65 | IPC:BPC | 30:70 | 600,000 |
| Comp. Ex. 1 | Prep. Ex. 7 | 50:50 | BPC | 100 | 390,000 |
| Comp. Ex. 2 | Prep. Ex. 8 | 40:60 | BPC | 100 | 570,000 |
| Comp. Ex. 3 | Prep. Ex. 9 | 40:60 | IPC:TPC | 40:60 | 310,000 |
| Comp. Ex. 4 | Prep. Ex. 10 | 50:50 | IPC:BPC | 5:95 | 560,000 |
| Comp. Ex. 5 | Prep. Ex. 11 | 50:50 | IPC:BPC | 60:40 | 250,000 |

* Imide:Amide ① represents a mole ratio of the first repeating unit to the second repeating unit + the third repeating unit.
* Ratio of amide repeating units ② represents a mole ratio of the second repeating unit (or the 2-2 repeating unit) to the third repeating unit (or the 2-2 repeating unit).

Experimental Example

The following properties were evaluated for the polyamide-imide films of the examples and comparative examples by the following methods, and the results are shown in Table 2.

1) Yellow Index (Y.I.)

The yellow index of the polyamide-imide film sample (thickness: 50±2 μm) prepared in the examples and comparative examples was measured according to the method of ASTM D1925 using a UV-2600 UV-Vis Spectrometer (SHIMADZU), and the results are shown in Table 2.

2) Haze

The haze of the polyamide-imide film sample (thickness: 50±2 μm) prepared in the examples and comparative examples was measured according to the method of ASTM D1003 using a COH-400 Spectrophotometer (NIPPON DENSHOKU INDUSTRIES), and the results are shown in Table 2.

3) Elastic Modulus (GPa)

The elastic modulus (GPa) of the polyamide-imide film sample (thickness: 50±2 μm) prepared in the examples and comparative examples was measured using Zwick/Roell Z005 (5 kN) under a strain rate of 12.5 mm/min, and the results are shown in Table 2.

4) Thickness Direction Retardation (Rth, Nm)

A refractive index was measured for the polyamide-imide film sample (thickness: 50±2 μm) prepared in the examples and comparative examples in a region of 400 nm to 800 nm using a prism coupler. Thereafter, the refractive index of the polymer film (the refractive index of the film with respect to light of 400 nm to 800 nm obtained above) was input to AxoScan manufactured by AXOMETRICS, and the thickness direction retardation (Rth) was measured using light having a wavelength of 400 nm to 800 nm at a temperature of 25° C. and humidity of 40%, followed by converting the thickness direction retardation value (value measured by automatic measurement of the measuring apparatus) into a retardation value per 10 μm thickness of the film.

TABLE 2

| Index | Y.I. | Haze | Elastic Modulus | Rth |
| --- | --- | --- | --- | --- |
| Ex. 1 | 4.29 | 0.45 | 5.69 | 5100 |
| Ex. 2 | 2.86 | 0.31 | 5.36 | 4065 |
| Ex. 3 | 7.00 | 1.08 | 5.53 | 5913 |
| Ex. 4 | 3.93 | 0.51 | 5.88 | 5315 |
| Ex. 5 | 3.55 | 0.42 | 5.45 | 4054 |
| Ex. 6 | 3.27 | 0.42 | 5.93 | 5025 |
| Comp. Ex. 1 | 30.8 | 26.2 | 5.42 | 6007 |
| Comp. Ex. 2 | 40.1 | 27.2 | 5.51 | 6517 |
| Comp. Ex. 3 | 10.8 | 2.73 | 4.21 | 3524 |
| Comp. Ex. 4 | 27.1 | 21.4 | 5.41 | 5980 |
| Comp. Ex. 5 | 2.81 | 0.30 | 4.07 | 3320 |

Referring to Table 1, the amide-imide copolymer can simultaneously improve thermal, mechanical, and optical properties by incorporating two amide repeating units having a specific structure according to the present disclosure at a specific ratio.

In the case of Comparative Examples 1 and 2 which do not include a part of the amide-derived repeating units defined by the present invention, the yellow index increases and the Rth value becomes 6000 or more, so that rigidity of the film itself becomes high, which makes it difficult to apply the film to a flexible display. In addition, it was confirmed that, in the case of Comparative Example 3 including repeating units having a structure other than the amide-derived repeating units of the present invention, there was a problem that the mechanical properties were remarkably lowered compared with the examples.

In particular, it was confirmed that, in the case of Comparative Example 4 in which the third repeating unit was excessively mixed out of the ratio of amide repeating units of the present invention, there was a problem that the yellow index and the haze were remarkably increased. In the case of Comparative Example 5 in which the second repeating unit was excessively mixed, it was confirmed that there was a problem that the mechanical properties were remarkably lowered.

The invention claimed is:

1. A polyamide-imide copolymer comprising a first repeating unit represented by Chemical Formula 1, a second repeating unit represented by Chemical Formula 2, and a third repeating unit represented by Chemical Formula 3, wherein a mole ratio of the second repeating unit to the third repeating unit is 10:90 to 50:50:

[Chemical Formula 1]

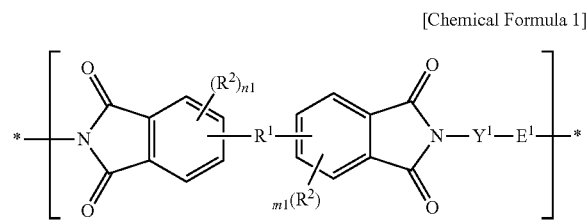

wherein, in the Chemical Formula 1, each $R^1$ is the same as or different from each other in each repeating unit, and each is independently a single bond, $-O-$, $-S-$, $-C(=O)-$, $-CH(OH)-$, $-S(=O)_2-$, $-Si(CH_3)_2-$, $-(CH_2)_p-$ (wherein $1 \leq p \leq 10$), $-(CF_2)_q-$ (wherein $1 \leq q \leq 10$), $-C(CH_3)_2-$, $-C(CF_3)_2-$, $-C(=O)NH-$, or a C6 to C30 divalent aromatic organic group;

each $R^2$ is the same as or different from each other in each repeating unit, and each is independently $-H$, $-F$, $-Cl$, $-Br$, $-I$, $-CF_3$, $-CCl_3$, $-CBr_3$, $-CI_3$, $-NO_2$, $-CN$, $-COCH_3$, $-CO_2C_2H_5$, a silyl group containing three C1 to C10 aliphatic organic groups, a C1 to C10 aliphatic organic group, or a C6 to C20 aromatic organic group;

n1 and m1 are each independently an integer of 0 to 3;

each $Y^1$ is the same as or different from each other in each repeating unit, and each independently comprises a C6 to C30 divalent aromatic organic group containing at least one trifluoromethyl group ($-CF_3$), and the aromatic organic group existing alone, two or more of the aromatic organic groups bonded to each other to form a condensed ring, or two or more of the aromatic organic groups plinked by a single bond, a fluorenylene group, $-O-$, $-S-$, $-C(=O)-$, $-CH(OH)-$, $-S(=O)_2-$, $-Si(CH_3)_2-$, $-(CH_2)_p-$ (wherein $1 \leq p \leq 10$), $-(CF_2)_q-$ (wherein $1 \leq q \leq 10$), $-C(CH_3)_2-$, $-C(CF_3)_2-$, or $-C(=O)NH-$; and each $E^1$ is independently a single bond or $-NH-$,

[Chemical Formula 2]

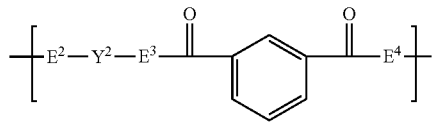

[Chemical Formula 3]

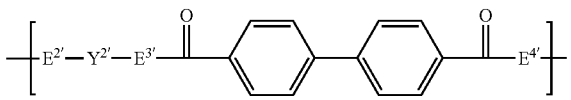

wherein, in the Chemical Formulae 2 and 3, $Y^2$ and $Y^{2'}$ are the same as or different from each other in each repeating unit, and each is independently a C6 to C30 divalent aromatic organic group containing at least one trifluoromethyl group ($-CF_3$), and the aromatic organic group exists alone, or two or more aromatic organic groups are bonded to each other to form a condensed ring, or two or more aromatic organic groups are linked by a single bond, a fluorenylene group, $-O-$, $-S-$, $-C(=O)-$, $-CH(OH)-$, $-S(=O)_2-$, $-Si(CH_3)_2-$, $-(CH_2)_p-$ (wherein, $1 \leq p \leq 10$), $-(CF_2)_q-$ (wherein $1 \leq q \leq 10$), $-C(CH_3)_2-$, $-C(CF_3)_2-$, or $-C(=O)NH-$; and $E^2$, $E^{2'}$, $E^3$, $E^{3'}$, $E^4$, and $E^{4'}$ are independently a single bond or $-NH-$.

2. The polyamide-imide copolymer of claim 1, wherein a mole ratio of the first repeating unit to a sum of the second repeating unit and the third repeating unit is 3:7 to 6:4.

3. The polyamide-imide copolymer of claim 1, wherein a mole ratio of the first repeating unit to a sum of the second repeating unit and the third repeating unit is 3:7 to 4:6, and a mole ratio of the second repeating unit to the third repeating unit is 30:70 to 45:55.

4. The polyamide-imide copolymer of claim 1,
wherein a mole ratio of the first repeating unit to a sum of the second repeating unit and the third repeating unit is 4.5:5.5 to 6:4, and
a mole ratio of the second repeating unit to the third repeating unit is 20:80 to 40:60.

5. The polyamide-imide copolymer of claim 1,
wherein the first repeating unit comprises a repeating unit represented by Chemical Formula 1-1:

[Chemical Formula 1-1]

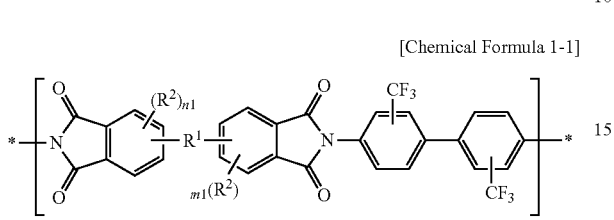

wherein, in the Chemical Formula 1-1,

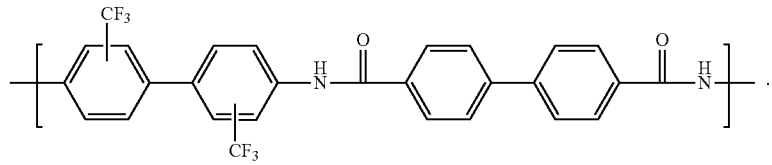

$R^1$, $R^2$, n1, and m1 are as defined in claim 1.

6. The polyamide-imide copolymer of claim 1,
wherein the second repeating unit comprises a repeating unit represented by Chemical Formula 2-1:

[Chemical Formula 2-1]

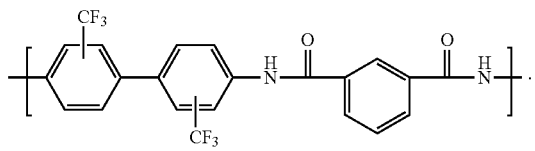

7. The polyamide-imide copolymer of claim 1,
wherein the third repeating unit comprises a repeating unit represented by Chemical Formula 3-1:

[Chemical Formula 3-1]

8. The polyamide-imide copolymer of claim 1,
wherein a weight average molecular weight is 10,000 to 1,000,000 g/mol.

9. A polyamide-imide film comprising the polyamide-imide copolymer of claim 1.

10. The polyamide-imide film of claim 9, wherein thickness direction retardation (Rth) measured at a wavelength of 400 nm to 800 nm is 4000 nm to 6000 nm.

11. The polyamide-imide film of claim 9, wherein a yellow index (Y.I.) measured at a wavelength of 380 to 780 nm in accordance with ASTM D1925 is 2.0 to 10.0.

* * * * *